United States Patent [19]

Pusch et al.

[11] 3,998,549
[45] Dec. 21, 1976

[54] METHOD FOR MEASURING THE TEMPERATURE OF AXLE BEARINGS OF VEHICLES

[76] Inventors: Günter Pusch, Bannholzweg 12, 6903 Neckargemund; Jens Dührkopp, Hirschgasse 23, Neckargemund, both of Germany

[22] Filed: Aug. 28, 1974

[21] Appl. No.: 501,213

[30] Foreign Application Priority Data

Aug. 31, 1973 Germany .......................... 2343904

[52] U.S. Cl. .............................. 356/48; 73/355 R
[51] Int. Cl.² .......................................... G01J 5/62
[58] Field of Search ............... 356/43, 48, 216; 250/338; 350/62; 73/355 R

[56] References Cited

UNITED STATES PATENTS

| | | | |
|---|---|---|---|
| 2,978,589 | 4/1961 | Howell | 356/48 |
| 3,045,551 | 7/1962 | Bonanno | 350/62 |
| 3,303,340 | 2/1967 | Hewett et al. | 356/43 |
| 3,461,284 | 8/1969 | Jay | 73/355 R |
| 3,621,258 | 11/1971 | Dreitzler | 73/355 R |

Primary Examiner—John K. Corbin
Assistant Examiner—Conrad Clark
Attorney, Agent, or Firm—Walter Becker

[57] ABSTRACT

A method of and a device for measuring the temperature of the axle bearing of a vehicle, especially of a rail vehicle while moving. The device is mounted adjacent a rail on which the vehicle runs and receives radiation from beneath the axle bearing over a strip-like range thereof of predetermined size. A detector receives the radiation after the radiation has been angularly diverted and develops an electrical signal in conformity with the value of the radiation. A modulator or interrupter ahead of the detector provides for an alternating, or pulsating, signal which is then amplified in an electronic circuit. For comparison purposes, a source of infra red radiation of known value is provided whereby the calibration of the device can be checked.

8 Claims, 7 Drawing Figures

METHOD FOR MEASURING THE TEMPERATURE OF AXLE BEARINGS OF VEHICLES

The present invention relates to a method and device for measuring the temperature of axle bearings of rail vehicles. The invention may also be employed for ascertaining undue temperatures of axle bearings. For carrying out the method according to the invention, the heat radiation eminated from the axle bearings of a rail vehicle passing by an optical sysem adjacent the railway track of the vehicle to be tested is caught by said optical system and conveyed to an infrared detector which converts said heat radiation into electric signals. In an adjacent electronic evaluating system, the signals are compared with those of a comparative heat radiating system and on the basis of said comparison, the increase in temperature of the axle bearings relative to a defined temperature will be ascertained.

It is known to compare the temperature of an axle bearing housing with a reference temperature. It is furthermore known to compare the radiation emitted by an axle bearing with the radiation of a comparative radiating system. Both methods, however, have not yielded satisfactory results because these systems absorb the radiation of half a bearing housing surface which has too low a value. When this became obvious, it was suggested to employ only the heat emitted from a portion of the bearing housing surface for creating the heat picture. To this end, the receiving device was turned on only as long as the provided portion of the bearing housing was located within the view field of the receiving device. The breakdown circuit for actuating the measuring sections were controlled by two rail contacts arranged at both sides of the receiving device. In order to be able to carry out the measuring method independently of the direction of the train passing by, two receiving objectives were employed, the receiving directions of which were arranged in a plane perpendicular to the wheel axle and inclined upwardly. A common evaluating electronic system was used for evaluating the measured value, which evaluating electronic system received the signals from one or the other direction depending on the direction in which the train was traveling. This device was rather unwieldy and in spite of this defect, did not yield the desired results because the measuring result was falsified by the background radiation which could not be avoided.

It is, therefore, an object of the present invention to provide a method of measuring the temperature of axle bearings of rail vehicles while employing infrared radiation emitted by the axle bearings, and so to design a comparative reference radiation source that the two radiations are clearly separated from each other and a falsification of the measuring results caused by partial intermixture of both signals will safely be avoided.

These and other objects and advantages of the invention will appear more clearly from the following specification, in connection with the accompanying drawings, in which.

The method according to the invention of measuring the temperature of axle bearings of rail vehicles is such that the infrared radiation of the parts to be measured (bearings) and that the infrared radiation of a defined reference source are directed alternately to one and the same infrared detector and the measuring alternating voltage thus occurring is employed as measurement for the temperature of the article to be measured.

According to this method, always only one course of beams, either the course of beams emitted by the article to be measured, or the course of beams emitted by the reference beam source is connected to the detector and a jumping of the signals of one detector to the other detector is made impossible.

In order to prevent that other parts of the vehicle which have been heated by causes other than bearing friction are additionally measured and thus give rise to a faulty measurement, it is suggested according to a further feature of the invention to direct the course of beams of the IR measuring device vertically, or nearly vertically, from below onto the bearing or the article to be measured.

The method according to the invention can furthermore be improved by having the IR receiving device always catch only a narrow strip of the axle bearing which extends in the direction of the geometric bearing axis and is perpendicularly located therebelow so that only the highest measuring value will be evaluated as criterium for the temperature. The dimensions of the strip may be, for instance, 1 × 5 cm².

It has also proved advantageous to carry out the temperature measurement with a narrow band in a window of the atmosphere. This can be realized by corresponding selection of the composition of the material of the detector. With the infrared band involved having a wave length of from 3 to 5 $\mu$m a cadmium-mercury-tellurit detector has its maximum sensitivity. When taking advantage of these conditions, a clear window of the atmosphere is obtained so that also influences of the weather will not affect the measured values.

For purposes of creating an alternating voltage, as a rule, a modulator is employed which is arranged in an intermediate picture plane of the optical system. The modulation is expediently so selected that a modulation frequency of some kilocycles or kHz will be obtained. With a modulation frequency of, for instance, 10 kHz there will be obtained 10 cycles with an axle width of 10 cm and a vehicle speed of 300 km per hour. This figure suffices in order to transmit a clear picture of the temperature of the axle bearing.

When employing a disc modulator, the webs may be used as reference source. With tuning fork-modulators, the webs are replaced by the fins. For forming the comparison temperature, two possibilities exist: The webs or the fins of the modulator are designed IR-reflecting. In such an instance, the detector views itself in the image and compares the heat radiation of the axle bearing with its own radiation. However, it is also possible to cool the modulator thermo-electrically and to control its temperature in conformity with a predetermined or reference temperature.

If the detector and the modulator are cooled thermo-electrically, the control may be so set that both respectively have the same temperature and thus also the same heat radiation. If this temperature is held constant, this can be done by known thermo-electric and electronic means, the measured result will be independent of the respective ambient temperature. In the above mentioned instance the detector itself serves as reference source.

For purposes of continuously checking the measuring sensitivity of the device, prior to moving in of the first axle of the train, beams of a defined temperature are sent into the course of the beams. For instance when opening the housing, a standard radiating device may be moved along the course of the beams which is set for a defined temperature of 60°.

Figure 1A:
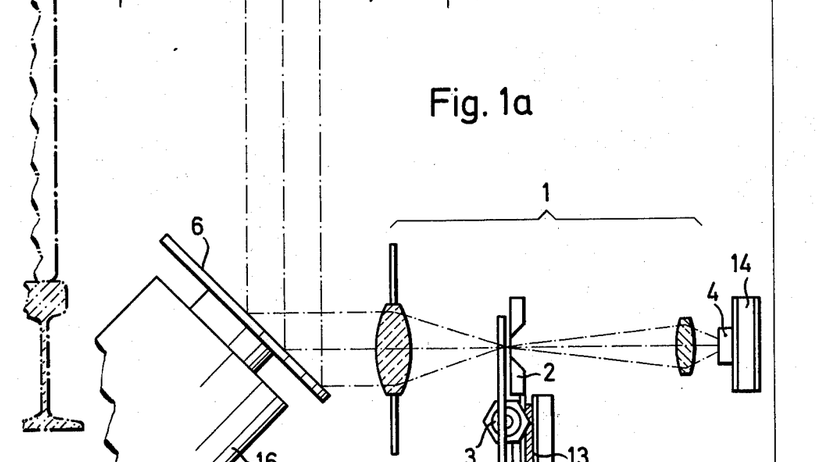
FIG. 1 is a diagrammatic illustration of a device according to the invention.
Figure 1B:
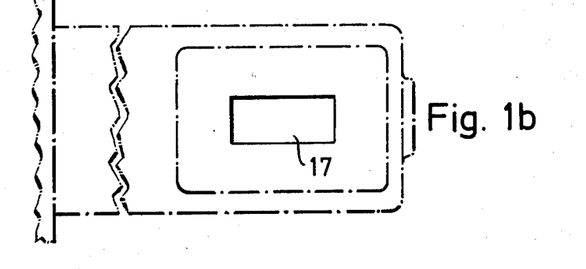

Referring now to the drawings in detail, the device shown therein comprises primarily an optical system 1, a modulator 3 which is arranged in an intermediate view plane and is equipped with an aperture 2 and an IR detector 4. The heat beams emitted by an axle bearing 7 moved thereabove is caught by a mirror 6 occupying an inclined position and is directed into the optical system. The bundle of beams is modulated by the modulator 3 and in this form hits the detector 4 which converts the oncoming heat beams into a measuring alternating voltage. Since there exists the possibility that in operation, i.e. when the device is still open at its upper portion, particles of soil, snow or rain drop upon the mirror and affect the conveyance of the heat beams to the optical system or even prevent such transfer, the mirror is designed as rotating deviating mirror and is equipped with a drive motor 16. As a result thereof, particles of soil, snow or rain impacting upon or dropping onto the mirror are thrown outwardly, and the mirror remains clean. The heat beams of the axle bearing are taken off in the form of a strip 17 extending parallelly with regard to the axis of the bearing. In this way, the heat beams caught by the device are limited to a certain fractional area of the bottom side of the axle bearing. The measuring strip has for instance the form of a rectangle with a height of 1 cm and the length of 5 cm. During the passing by of the vehicle, this measuring strip moves from the front to the rear transverse over the axle bearing.

Figure 2:
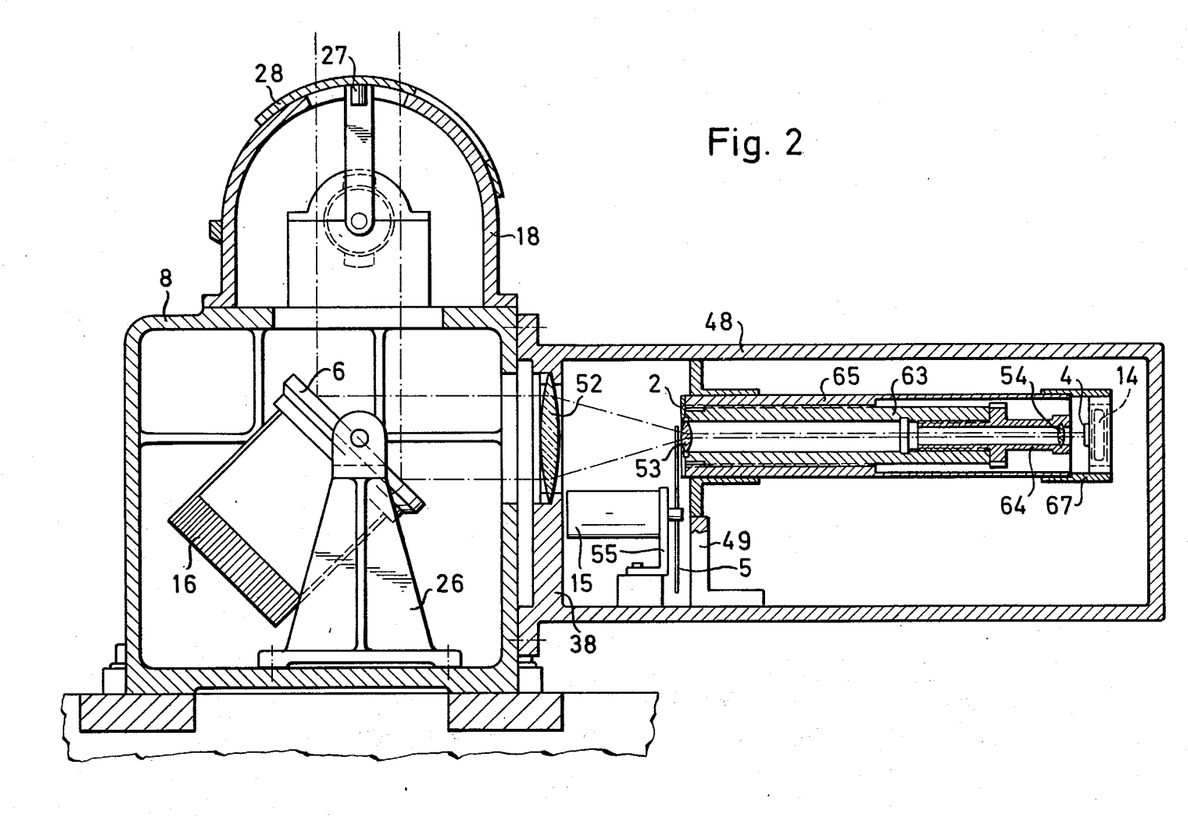
FIG. 2 represents a section through the device of FIG. 1 with adjustable deviating mirror and a modulation disc.
Figure 2A:
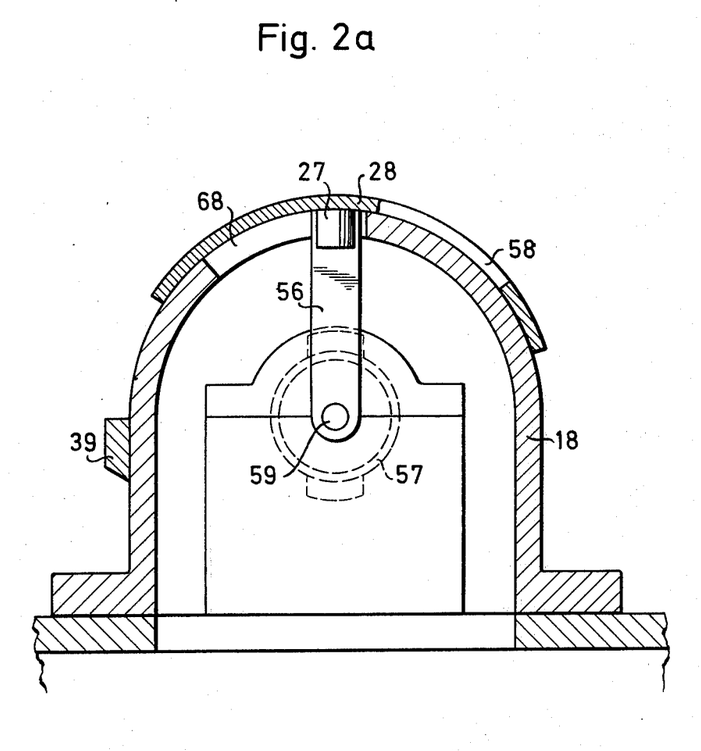

The drawing shows two different structural embodiments of the receiving device. Parts corresponding to those in FIG. 1 are designated with the same reference numerals. The diverting mirror 6 is arranged in a housing 8 and together with its drive motor 16 is pivotally mounted in two supports 26. In this way, it will be assured that the mirror can also belatedly precisely set into its position relative to the optical system 1 and to the receiving tube 18. The receiving tube 18 is covered toward the top by a closure 28. This closure will be automatically opened when the first axle arrives and will automatically be closed after the last axle has passed by. On its inner side, the closure supports a standard radiator 27 or radiating device which at the opening movement is moved by the diverting mirror and conveys a defined comparison temperature to the detector. Flanged to the housing 8 toward the outside is a cylinder 48 which is closed at the end and which receives the optical system, the modulator, and the detector. The receiving objective is arranged in a partition 38, while that part which is located behind the modulator is carried by a support 49. In this instance the modulator 5 is designed as disc modulator and is driven by a flange motor 15.

Figure 3:
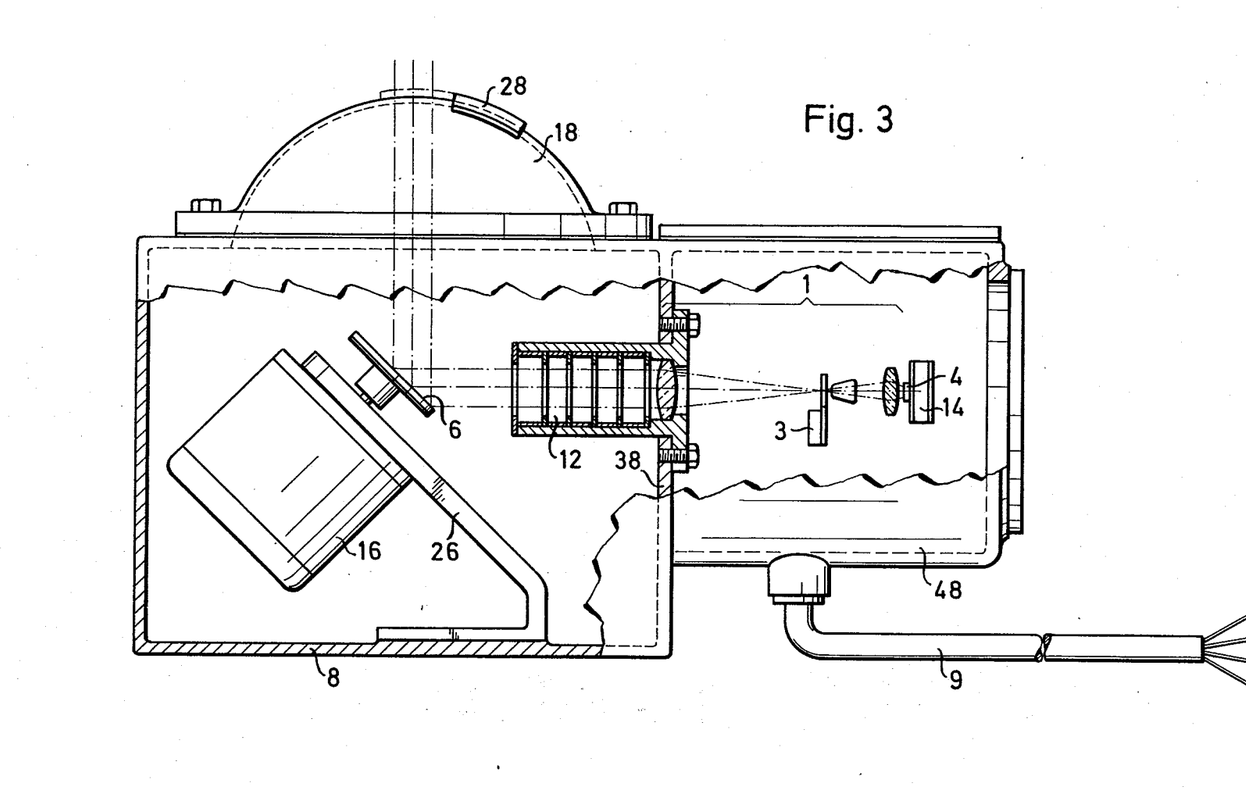
FIG. 3 illustrates a longitudinal section through a device according to the invention with fixedly installed deviating mirror and a tuning fork modulator.

According to the embodiment of FIG. 3, the diverting mirror is fixed, i.e. not pivotable and it is built into a holding means 26. In this instance, the receiving tube 18 is replaced by a cupola on the outside of which the closure 28 is adapted to slide. Adjacent the housing 8 toward the right there is provided an outwardly closed cylinder 48 in which are arranged the optical system, the modulator and the detector. In front of the receiving objective which also in this instance is inserted into the partition 38, there is provided an aperture jalousie 12 which keeps soil particles away from the objective which are thrown off by the diverting mirror. In this instance, the modulator 3 is designed as a tuning fork-modulator. The detector 4 is provided with a thermo-electric cooling system 14. The reference numeral 9 designates a feeding cable for electric current. The design of the modulator as a tuning fork-modulator has the advantage that during the opening movement a nearly rectangular view field is freed which facilitates the adaptation to the strip-shaped receiving of the bearing temperature.

Figure 4:
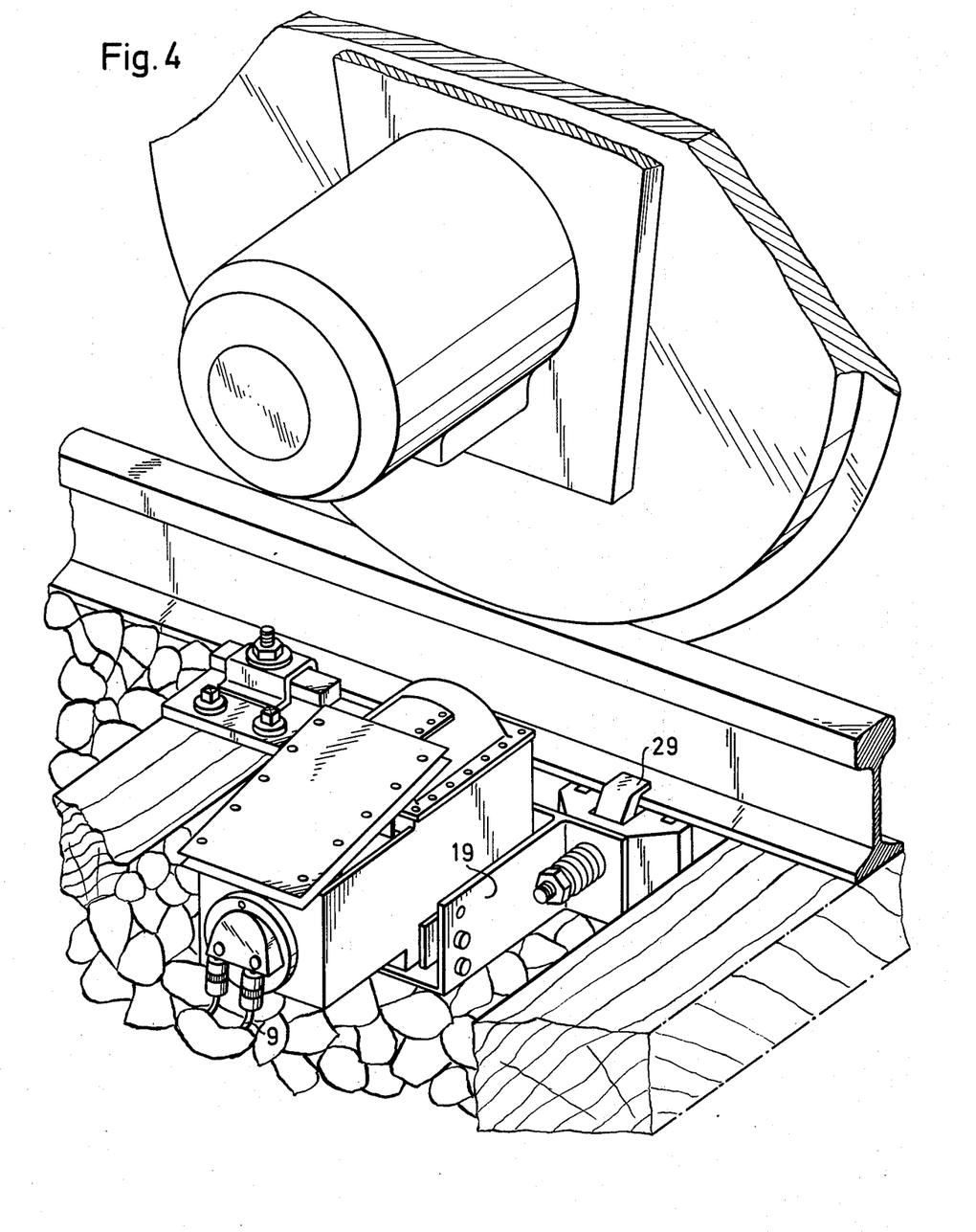
FIG. 4 is an isometric view of a receiving apparatus with clamping devices and axle bearings movable thereover.

The outside view of the device illustrated in FIG. 4 shows the compact simple construction and position of the device relative to the by-passing wheel. The device is mounted in a supporting shoe 19 which by known clamping devices 29 is easily detachably connected to the foot portion of the rail.

Figure 5:
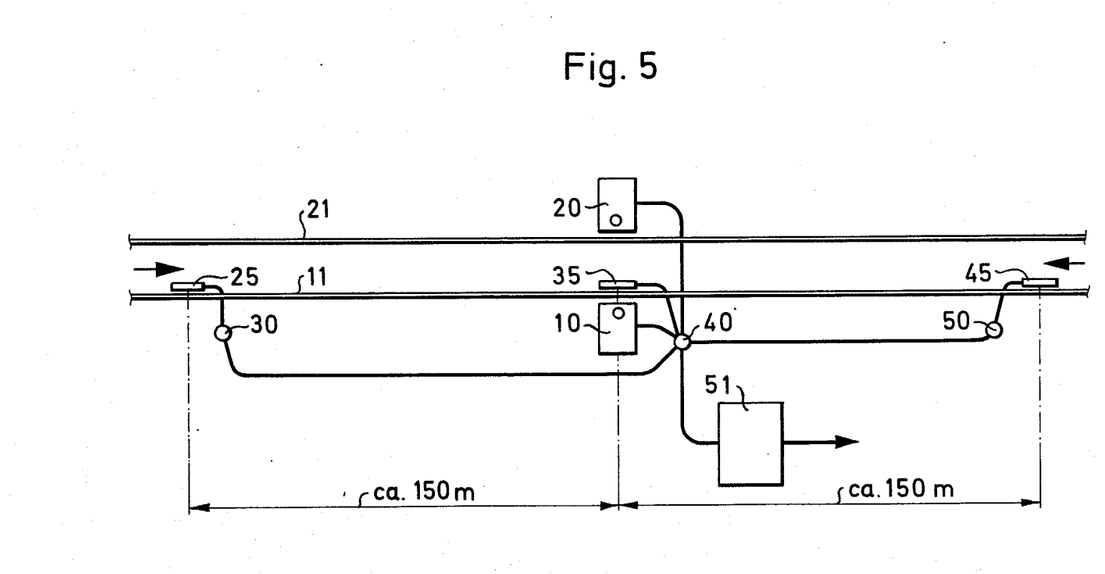
FIG. 5 diagrammatically illustrates the overall arrangement of the measurement devices with two receiving devices arranged on opposite sides of the tracks and located opposite to each other.

The over-all installation shown in FIG. 5 comprises a receiving device 10 arranged on the outside of rail 11, three magnetic switches 25, 35, 45 on the inner side of rail 11, three distributors 30, 40, and 50 respectively associated with a magnetic switch, and the evaluating electronic device 49. Magnetic switch 35 is arranged along the longitudinal axis of the receiving device 10 and located opposite thereto. The magnetic switches 25 and 45 are arranged in both directions at a distance of approximately 150 meters from the magnetic switch 35. The magnetic switches comprise three distributors 30, 40, 50 of which the two outer distributors 30 and 50 are connected by conductors to the intermediate switch 40. From the distributor 40 a line leads to the receiving device 10 while another line leads to an evaluating electronic device 49.

If desired, an additional measuring device 20 may be arranged on the outside of the second track 21 and may evaluate the there measured value as reference value with regard to that of the other bearing of the same axle. In this instance, the measuring device 20 must likewise be connected to the distributor 40.

When a train approaches, the magnetic switch over which the train rolls first opens the closure of the receiving device and simultaneously turns on the drive motor 16 of the deviating mirror 6. It will be appreciated that depending on the direction the opening magnetic switch is either the switch 25 or the switch 45. When the closure opens, simultaneously the radiating device 28 is moved over the deviating mirror. Depending on whether the magnetic switch 25 or the magnetic switch 45 is released first, the device counts and measures in the corresponding driving direction of the train. The magnetic switch 35 takes over the opening and closing key operation of the measured value at +5 and —5 cm respectively from the optical axis in driving direction.

The Peltier cooler 14 of the detector 4 has associated therewith a temperature cooler 24 which by means of a temperature control 34 maintains the temperature of the detector constant. Similarly, the Peltier cooler 13 of the modulator 3 has associated therewith a temperature cooler 23 which by means of a temperature control 33 keeps the temperature of the modulator constant.

Figure 6:
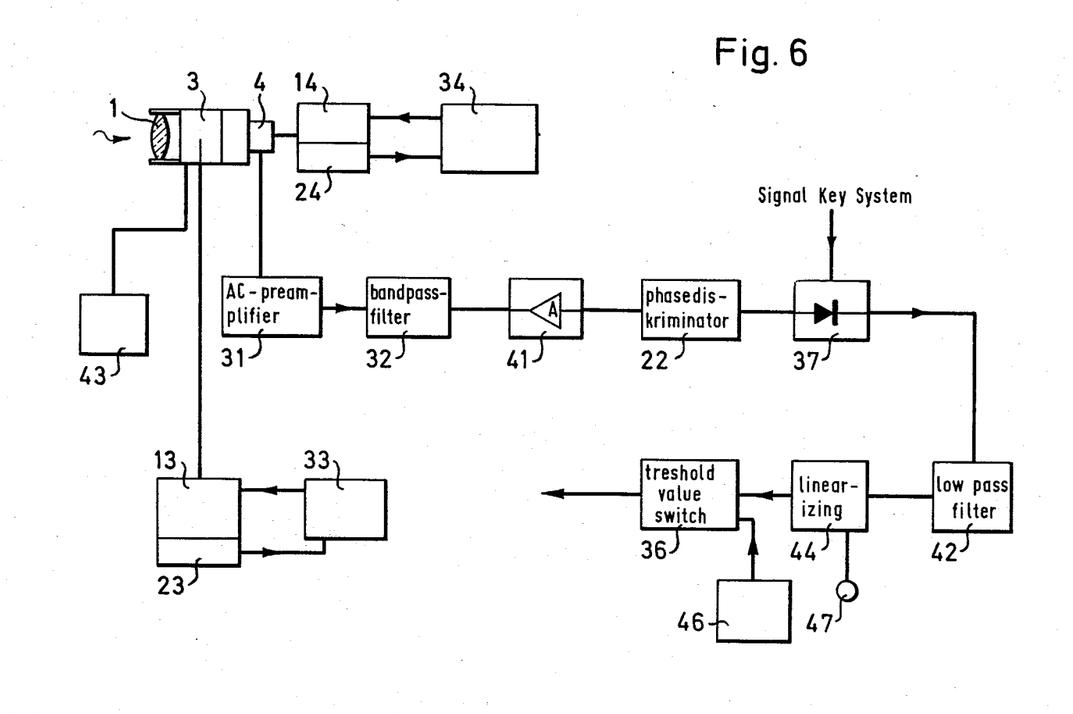
FIG. 6 is a block diagram of the control electronic pertaining to the device and also diagrammatically indicates the evaluating electronic.

The receiving electronics (FIG. 6) comprises behind the detector 4 a pre-amplifier 31, a band pass filter 32 and an AC main amplifier 41. The main amplifier is followed by a phase discriminator 22 and a rectifier 37. This rectifier is furthermore connected to the rail contacts. From the rectifier a conductor passes through a low pass filter 42 to the linear rising network 44. The network 44 is on one side followed by a threshhold value switch 36 (digital part) which conveys the digital signal for coding and further processing, for instance by remote control. Here are also connected the acoustic and/or optical warning device. The threshhold value switch has additionally associated therewith a sensor for the air temperature 46 which serves for adapting the threshhold value to the respective air temperature. On the other side, the linear rising mechanism is followed by a temperature indicator 47 which continuously and currently indicates the temperature. If desired, also a writing device may here be connected for a continuous checking of the device.

In operation, the magnetic switch 35 switches the transmission path of the measured value on and off. In this way it will be assured that only within the time in which actually the wheel bearing is above the optical axis, a transfer of the measuring value and registration thereof or processing thereof is effected. This means that the effective locus of the switch is spaced from the optical axis by a distance of ± 5 cm. An important advantage of the invention consists in that when receiving the heat beams vertically from below, only one magnetic switch is necessary for limiting the transmission.

The portion to be reproduced of the wheel bearing in the magnitude of 1 × 5 cm² is reproduced in an intermediate picture plane through the intervention of the deviating mirror and the IR objective. In this picture plane, an electronically energized tuning fork-system brings about a modulation with a frequency of for instance 2,500 cycles. The pins oscillating back and forth interrupt the course of the beams and at the same time serve as reference value. The IR detector consists of highly sensitive cadmium-mercury-tellurit and has its optimum sensitivity in the infrared band of from 3 to 5 μm wave length. In this band a clear window of the atmosphere exists so that no change in the measured value will occur due to changes in the weather. The axle bearing which physically represents a grey body of approximately from 30° to 100° C radiates so much heat energy in this IR band that a sufficiently great Rausch-distance (30 DB) is assured. In order always to assure a uniform sensititvity of the infrared detector, the latter is thermo-electrically cooled to a temperature of approximately −30° C. When considerable cold prevails, the entire housing is heated up to approximately 10° C in order to prevent icing.

When the fins of the modulating device appear in the view field, the detector will measure a radiation which corresponds to the radiation emanated by the fins. If the modulator 3 is likewise cooled as provided in FIG. 1, a defined reference voltage is obtained which can be used as comparison voltage with regard to the voltage generated by the received axle bearing beams.

If the modulator and detectors are cooled to the same temperature, the reference temperature corresponds to that of the detector. Another possibility to obtain detector temperature as reference temperature consists in designing the fins or webs of the modulators as IR reflecting on that side which faces the detector. In such instance, the fins must be so shaped that the detector will see itself in the image or will see its cooled surrounding.

During the waiting position of the device, a standard radiating device is continuously located in the course of the beams. This standard radiating device which represents a defined bearing temperature of for instance 60° C emits a defined energy into the course of the beams and thus to the infrared detector. The alternating voltage generated by the modulation serves as genuine measuring and checking value for the sensitivity or characteristic line of the infrared detector and the entire amplifier chain. A further possibility of additional formation of reference signals is obtained when the modulator is continuously operated in waiting position.

Inasmuch as the device measures the infrared beam output, the emission coefficient of the individual axle bearing plays a decisive role. According to experience it may vary between 0.2 and 0.5. This, however, has only a minor influence upon the absolute temperature measuring because the beam output depends with the fourth power on the temperature. Measuring errors at the magnitude of ± 10° may occur in the temperature with the absolute measuring of an axle bearing.

When comparing with each other two axle bearings of the same axle, it can be assumed that their emission coefficient is approximately the same because axle bearings of the same design, the same running period and the same material are involved. Therefore, the comparison measurement between two axle bearings of the same axle will form a reliable measurement because it is improbable that two axle bearings of an axle run hot simultaneously. When comparing the two measuring values, the emission coefficient drops out whereby the absolute indication precision is increased.

The magnetic switches 25 and 45 arranged in front and behind the optical course of the beams not only turn on the measuring aperture for the time of the measurement but also permit the counting of the axles. By this counting, the data processing will receive the address of the respective measuring point. The summarizing amplifier combines the signals and conveys the same through the TF cable to the central checking and registering device.

The oncoming TF signals are first sorted by filters and by means of amplifiers are converted into digital signals. A counter stores the number and conveys its contents together with the measured temperature information to a storing unit. The capacity of this storing device is so selected that some storing space will be available for possibly occurring faulty information. The printing control controls the issue of the measured value automatically after the train has passed by. An acoustic signal is given when axle bearings have been found to have run hot.

Inasmuch as exclusively semi-conductor elements, and primarily integrated circuits are employed, high reliability and servicing freedom are assured. Due to the fully automatic ascertainment of the measured value and the issue of the measured value by decimal printers, the handling of the device according to the present invention is so simple that non-skilled operators can handle the same without difficulties.

It is, of course, to be understood, that the present invention is, by no means, limited to the specific showing of the drawings, but also comprises and modifications within the scope of the appended claims.

What is claimed is:

1. The method of detecting the temperature of axle bearings of vehicles including steps in combination which comprise: establishing a source of infra red radiation of known value, and supplying infra red radiation from the axle bearing to be measured and radiation from said source alternately to a detector and developing an alternating voltage in conformity with the detected radiation, and measuring the said voltage, said infra red radiation from the axle being that radiation which is supplied vertically downward therefrom within the range of a strip of predetermined dimensions, interposing a modulator between the axle and the detector, controlling the temperature of said modulator in a way that both the modulator and the detector have the same temperature, and reflecting the radiation of said detector from said modulator back to said detector.

2. The method in combination according to claim 1 in which the infra red radiation detected by the detector falls within a relatively narrow band at which the atmosphere is substantially transparent.

3. The method in combination according to claim 1 which includes employing said modulator as said known source, and controlling the temperature of said modulator in a way that it remains constant.

4. The method in combination according to claim 3 in which the temperature of said modulator is controlled thermoelectrically.

5. The method in combination according to claim 1 which includes actuating said modulator to provide a frequency of modulation of the radiation from the axle which is in the low kilo hertz range.

6. The method in combination according to claim 1 in which the detector forms said source of radiation of known value.

7. The method in combination according to claim 1 in which said detecting is accomplished while said axle bearing is moving relative to the detector, and said method includes checking the sensitivity of said detector prior to the axle bearing coming within detecting range by supplying radiation of a known value to said detector.

8. The method in combination according to claim 1 which includes cooling said modulator to a predetermined temperature.

* * * * *